Oct. 21, 1930.    D. I. REITER    1,779,250

SNAP FASTENER CAP AND METHOD OF MAKING SAME

Filed Dec. 17, 1928

INVENTOR:
Daniel I. Reiter,

By Attorneys,
Fraser, Myers & Manley.

Patented Oct. 21, 1930

1,779,250

UNITED STATES PATENT OFFICE

DANIEL I. REITER, OF NEW YORK, N. Y.

SNAP-FASTENER CAP AND METHOD OF MAKING SAME

Application filed December 17, 1928. Serial No. 326,543.

This invention relates to an improved cap for a snap fastener element, more particularly adapted for use as a cap for a snap fastener socket, and an improved method of making such a cap.

It is an object of the invention to provide, from a single piece of metal, a cap having a substantially circular opening to receive the snap fastener socket or other coupling element, but being otherwise of an artistic and attractive form or configuration such, for example, as an ellipse, diamond, or other polygonal shape, as distinguished from the caps of circular configuration now commonly used in the art.

In the accompanying drawings illustrating the preferred and a modified form of the invention:—

It has been common practice, in the manufacture of snap fasteners, to produce a socket by uniting an expansible socket element to a circular cap.

To meet the demand of the public it has been found necessary to produce snap fasteners having one of the metal elements exposed at the surface of the material opposite the coupling element of an artistic design other than that of the usual circular cap. Such elements have been made in various forms, of different dimensions along different axes, such, for example, as in the shape of an ellipse, or of a diamond, or other figure having a polygonal outline. Heretofore, this has been accomplished by applying the non-circular element to the snap fastener stud. Such a fastener has been produced by soldering the stem to a cap, and then securing the stem and cap to a stud element.

Non-circular snap fasteners of the prior art, when made in the above-described manner, provide an article having one exposed element, which may be of any desired artistic shape, but the entire snap fastener, including the stud and the socket, comprises five elements, two of which must be soldered together. Heretofore, efforts to produce a simple fastener comprising a stud and a socket each built up of but two parts and at least one having an exposed element of some artistic form other than that of a circle, have been unsuccessful.

Figure 2:
Fig. 2 is a perspective view of the same cap, disclosing the portion having the substantially circular opening to receive the snap fastener socket or other coupling element.
Figure 4:
Figure 6:
Figure 8:
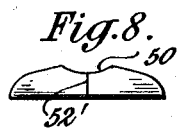
Figure 1:
Figure 1 is a perspective view of a cap, made in accordance with and embodying the invention, disclosing its ornamental back or face portion.

The invention herein disclosed relates to an improved snap fastener cap, and improved method of making such a cap, of non-circular outline, having a substantially circular opening to receive one of the coupling elements of a snap fastener, preferably the socket element, the cap being made from a single sheet of metal having portions lying beyond the outline of the exposed back turned upwardly and inwardly to form the finished product 47 (Figs. 1 and 2).

Figure 3:
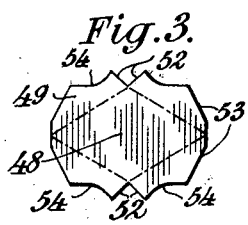
Figs. 3 and 4 are respectively a plan view and an edge view of a plate from which the cap illustrated in Figs. 1 and 2 may be made.
Figure 7:
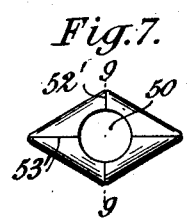
Figs. 7 and 8 are, respectively, a face view and an edge view of a completed cap, the face view disclosing the portion of the cap adapted to receive the coupling element.

In its preferred form the cap 47 may be made from a sheet of material or blank 48 (Fig. 3) having a central portion, indicated in broken lines, to form the exposed back of the cap, and outlying portions 49 to be turned upwardly and inwardly to form the part of the cap surrounding the substantially circular opening 50 (Fig. 7).

Figure 5:
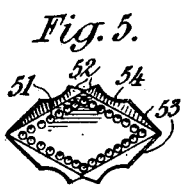
Figs. 5 and 6 are, respectively, a face view and an edge view of a partly-completed cap.

The finished cap 47 may be made from the sheet of material 48 as a result of any desired number of steps in a manner well known in the art. For example, the portions 49 may first be turned upwardly to the positions indicated in Fig. 5, and, as a part of the same operation, any desired ornamentation may be impressed into the material as indicated at 51. The portions 49 may, as a part of a subsequent operation, be turned inwardly until the edge portions 52 and 53 are brought into contact to form the joints 52' and 53', as illustrated in Fig. 7. The curved portions 54 of the blank will at the same time be brought into a relationship of continuity to form the boundary of the opening 50 (Fig. 7).

Figure 9:
Figs. 9 and 10 are, respectively, a cross-sectional view through a cap like the one disclosed in Figs. 1 and 2 and a socket member adapted to be secured to said cap.
Figure 11:
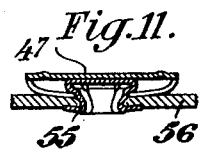
Fig. 11 is a view in cross-section through a snap fastener socket formed by attaching the parts illustrated in Figs. 9 and 10 to a piece of fabric or other suitable material.
Figure 10:

In Fig. 9 is illustrated a cross-section through the cap illustrated in Fig. 7, the section being taken along the line 9—9, and in Fig. 10 is indicated one of the socket elements 55 which may be combined with the cap 47 to produce a finished socket as shown in Fig. 11. This is effected by passing the socket 55 through an opening in the material 56 and pressing the parts together so as to slightly flatten or spread the upper portion of the socket element into the cavity in the cap, whereby the two metal elements and the material 56 are firmly secured together.

The socket illustrated in Fig. 11 is adapted for use with any suitable snap fastener stud.

Figure 12:
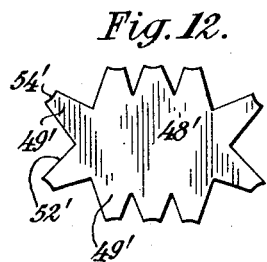
Fig. 12 is a face view of a blank from which a cap of modified form may be made.
Figure 13:
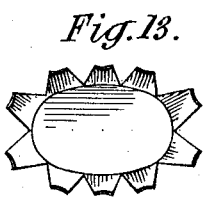
Fig. 13 is a face view of the modified cap when partly formed.
Figure 14:
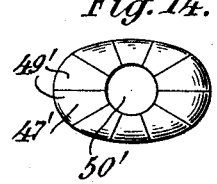
Fig. 14 is a face view of the completely-formed modified cap, disclosing the face having a substantially circular opening to receive a coupling element.

In Figs. 12, 13 and 14 is illustrated a modified form of snap fastener cap of elliptical configuration. The finished cap 47', illustrated in Fig. 14, may be formed from a blank 48' of substantially the form indicated in Fig. 12, having fingers 49' which may be turned upwardly to positions indicated in Fig. 13 and then inwardly to the positions indicated in the finished cap as illustrated in Fig. 14. In this form, as in the preferred form, of the invention, the curved end portions of the blank 54' are brought into a relationship of continuity by the bending of the fingers so as to cooperate in forming the boundary of the opening 50' to receive the coupling, and the edge portions of the fingers 52' are brought into contact with each other when bent to their final form as illustrated in Fig. 14.

From the foregoing description it will be apparent that applicant has made it possible to produce a simple four-part snap fastener in no manner dependent upon soldered joints, and that such a fastener may comprise a two-part socket element having an exposed ornamental cap which may be of any desired configuration.

The invention is not intended to be limited to either of the specific forms herein disclosed for purposes of illustration, but should be regarded as covering modifications and variations thereof within the scope of the appended claims.

What is claimed is:

1. The method of making a snap fastener cap having a substantially circular opening to receive a snap fastener coupling element and a back of greater area than the opening and of materially different dimensions along different axes, said method consisting in cutting a sheet of metal to a form having a plurality of tabs extending beyond the margin of the portion intended to form the finished back portion of the cap, said tabs being of the form required to produce the portion of the cap surrounding the opening, and in bending said tabs upwardly and inwardly to bring their adjacent edge portions nearest the back into mutual contact, the terminal edge portions being brought into a relationship of continuity so as to serve as the marginal portions of the substantially circular opening.

2. The method of making a snap fastener cap, having a substantially circular opening to receive a snap fastener coupling element and a back of polygonal form, which consists in cutting a sheet of metal to the required shape and then bending its peripheral portions to produce the finished article in accordance with the method defined by claim 1.

3. The method of making a snap fastener cap, having a substantially circular opening to receive a snap fastener coupling element and diamond-shaped back, which consists in cutting a sheet of metal to the required shape and then bending its peripheral portions to produce the finished article in accordance with the method defined by claim 1.

4. A snap fastener cap of shell-like formation having a back of materially different dimensions along different axes and, in its opposite face, a circular opening of appropriate diameter to receive a snap fastener coupling element of a diameter less than the minor axis of said back, said cap comprising a single piece of metal having rolled portions, extending from its back, which cooperate to form the part of said cap surrounding said opening, said rolled portions consisting of tabs of a form such that their adjacent edge portions leading away from the back lie in mutual contact and their terminal edge portions serve as the marginal portion of the face of said cap immediately surrounding said circular opening.

5. A snap fastener cap, as defined by claim 4, having a back of polygonal form.

6. A snap fastener cap, as defined by claim 4, having a diamond-shaped back.

In witness whereof, I have hereunto signed my name.

DANIEL I. REITER.